United States Patent [19]

Leach et al.

[11] Patent Number: 5,238,163

[45] Date of Patent: Aug. 24, 1993

[54] VISOR TOOTHPICK HOLDER

[76] Inventors: Clifford E. Leach, P.O. Box 434, Paris, Tex. 75460; Carl G. Brown, P.O. Box 497, Blossom, Tex. 75416

[21] Appl. No.: 896,410

[22] Filed: Jun. 10, 1992

[51] Int. Cl.⁵ ............................................. B60R 7/00
[52] U.S. Cl. ..................................... 224/312; 224/242; 224/252; 206/380; 220/356; 220/DIG. 19
[58] Field of Search ............... 224/252, 312, 242, 253; 206/38, 37, 380; 220/DIG. 19, 356, 367, 229; 132/328

[56] References Cited

U.S. PATENT DOCUMENTS

| | | | |
|---|---|---|---|
| D. 159,954 | 9/1950 | Catanese | D14/6 |
| D. 310,301 | 9/1990 | Burrow | D3/34 |
| 1,385,288 | 7/1921 | Walker | |
| 1,397,232 | 11/1921 | Prickett | 224/252 |
| 1,705,241 | 3/1929 | Domerude | 206/380 |
| 2,667,394 | 1/1954 | Goetz et al. | 312/79 |
| 2,884,122 | 4/1959 | Severson | 206/37 |
| 3,204,762 | 9/1965 | Shanok et al. | 206/56 |
| 3,315,402 | 4/1967 | Scott et al. | 220/229 |
| 5,014,947 | 5/1991 | Wang | 248/214 |

*Primary Examiner*—Linda J. Sholl
*Attorney, Agent, or Firm*—Jacobson, Price, Holman & Stern

[57] ABSTRACT

A visor attached toothpick holder adapted to be mounted on the interior sun visor of an automobile, pickup truck or similar vehicle to support a plurality of toothpicks in a convenient access position to the operator of a vehicle thereby enabling the vehicle operator to gain access to, remove and use the toothpick while maintaining full control of the vehicle and full attention to driving conditions. The toothpick holder is in the form of a receptacle having a clip thereon for securing the receptacle to an edge of a sun visor together with a resilient cap having a slit therein which receives and frictionally grips a plurality of toothpicks with one tapered end of the toothpicks projecting outwardly from the cap to provide access thereto.

3 Claims, 1 Drawing Sheet

VISOR TOOTHPICK HOLDER

BACKGROUND OF THE INVENTION

1. Field of the Invention

The present invention generally relates to a visor attached toothpick holder adapted to be mounted on the interior sun visor of an automobile, pickup truck or similar vehicle to support a plurality of toothpicks in a convenient access position to the operator of a vehicle thereby enabling the vehicle operator to gain access to, remove and use the toothpick while maintaining full control of the vehicle and full attention to driving conditions. The toothpick holder is in the form of a receptacle having a clip thereon for securing the receptacle to an edge of a sun visor together with a resilient cap having a slit therein which receives and frictionally grips a plurality of toothpicks with one tapered end of the toothpicks projecting outwardly from the cap to provide access thereto.

2. Description of the Prior Art

Various devices have been mounted on sun visors on the interior of an automobile to support such devices in convenient position for access. The following U.S. patents relate to such structures.

|  |
| --- |
| 1,385,288 |
| 2,667,394 |
| 3,204,762 |
| 5,014,947 |
| D 159,954 |
| D 310,301 |

While the above patents disclose various devices mounted on sun visors and the Walker patent discloses a toothpick holder which also forms a handle for the toothpick which is not attached to a sun visor. None of the patents disclose the specific structure of the toothpick holder of the present invention and the prior patents do not disclose the combination of a toothpick holder with a visor.

SUMMARY OF THE INVENTION

An object of the present invention is to provide a visor attached toothpick holder in the form of a receptacle having an open end and a clip on one surface thereof for attachment to an edge of a sun visor combined with a closure cap of flexible resilient material having an elongated slit formed therein for receiving and frictionally retaining a plurality of toothpicks with one end of each toothpick received in the receptacle and the other end projecting outwardly from the resilient slit thereby maintaining the toothpicks in readily accessible position and enabling the toothpicks to be readily removed and used.

Another object of the invention is to provide a toothpick holder in accordance with the preceding object in which the receptacle and clip are constructed of unitary plastic material having substantial rigidity but with a clip having sufficient flexibility and resiliency to securely hold the receptacle on the edge of a sun visor with the toothpicks projecting from one end of the receptacle and beyond the edge of the visor to facilitate access thereto by a vehicle operator thus enabling the vehicle operator to grasp and remove a toothpick while maintaining full attention to driver responsibilities.

A further object of the invention is to provide a visor attached toothpick holder in accordance with the preceding objects in which the cap is constructed of soft resilient material such as neoprene, soft rubber or the like having resilient characteristics sufficient to securely frictionally grip toothpicks to hold them in position but yet enable them to be easily removed with the structure of the holder being relatively inexpensive, easy to attach and remove and easy to reload with toothpicks and maintaining a plurality of toothpicks in readily accessible position to the operator of a vehicle by mounting the toothpick holder on an edge portion of a sun visor.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
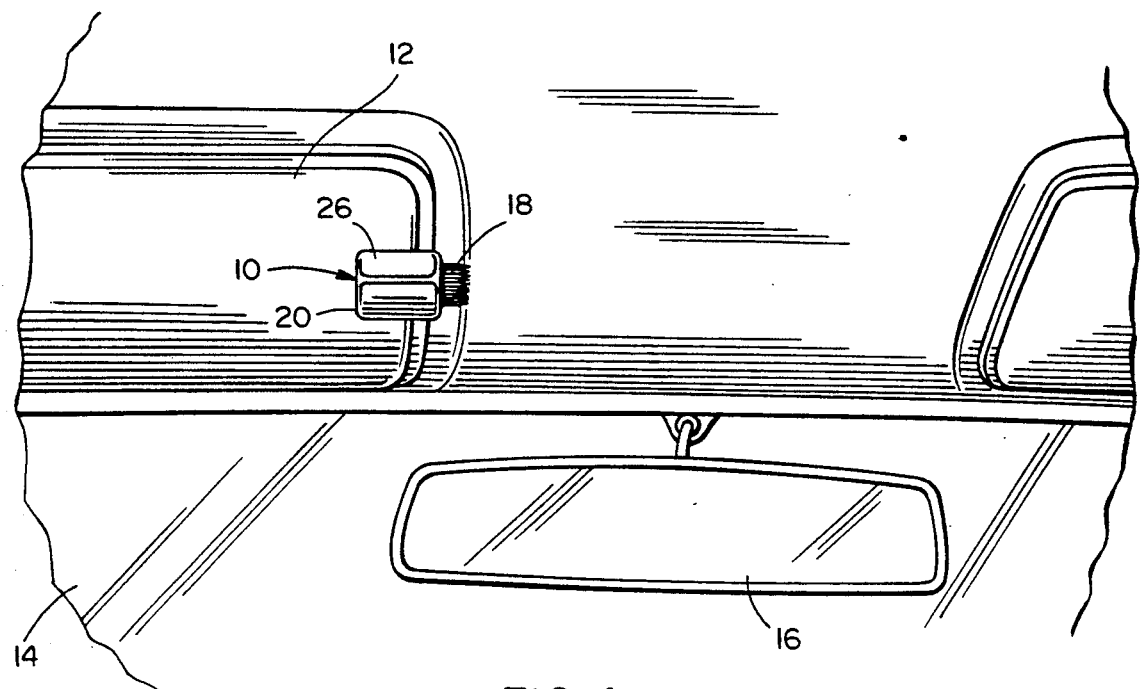
FIG. 1 is a perspective view of the interior of an automotive vehicle illustrating the relationship of the toothpick holder to an end edge of a sun visor immediately above a portion of a rearview mirror.
Figure 2:
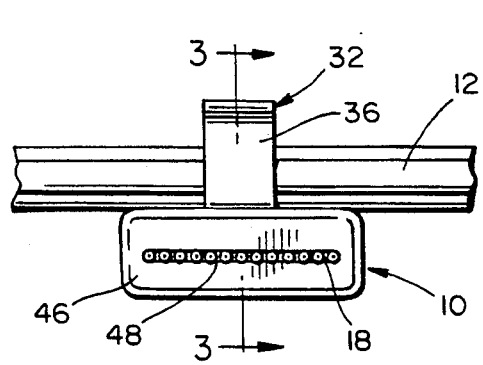
FIG. 2 is an end elevational view of the toothpick holder illustrating the slit and toothpicks inserted therein.

Referring now to FIG. 1 of the drawings, the toothpick holder of the present invention is generally designated by reference numeral 10 and is illustrated as being mounted on an inner end edge of a sun visor 12 that is pivotally supported above the upper edge of a vehicle windshield 14 with the toothpick holder 10 being located generally above the end edge of a rearview mirror 16 that is closest to the vehicle operator thereby enabling the vehicle operator to readily locate the toothpick holder and grasp one of a plurality of toothpicks 18 that are supported by the toothpick holder 10.

The toothpick holder 10 is in the form of a receptacle including an outer wall 20, an inner wall 22 interconnected by a bottom wall 24 and side walls 26 and 28 thus defining a receptacle having an open end 30 which receives a plurality of toothpicks 18 with the major length portion of each toothpick 18 being disposed interiorly of the receptacle. As illustrated, the receptacle is generally rectangular in configuration with the walls 20 and 22 being parallel to each other and spaced apart a distance substantially greater than the diameter of the toothpicks 18.

Figure 3:
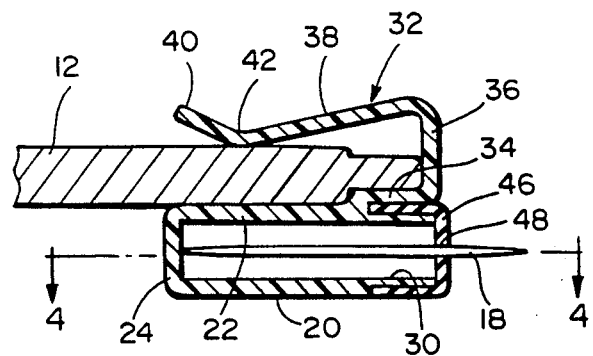
FIG. 3 is a vertical sectional view taken substantially upon a plane passing along section line 3—3 on FIG. 2 illustrating specific structural details of the toothpick holder.
Figure 4:
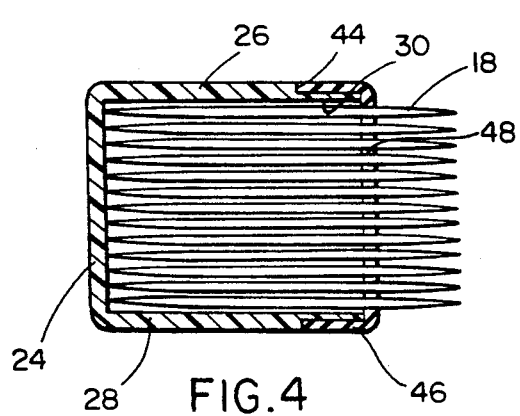
FIG. 4 is a longitudinal, vertical sectional view taken substantially upon a plane passing along section 4—4 on FIG. 3 illustrating further structural details of the toothpick holder and the relationship of the toothpick thereto.
Figure 5:
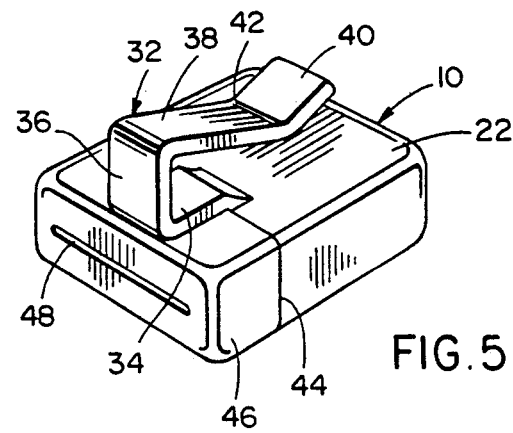
FIG. 5 is a perspective view of the toothpick holder without toothpicks.

Integral and unitary with the inner wall 22 is an offset clip generally designated by reference numeral 32 and including a wall portion 34 that is integral and unitary with but offset and spaced from the inner wall 22 as illustrated in FIG. 3. The outer end of the wall portion 34 includes a laterally extending wall portion 36 that is generally perpendicular to the inner wall 22 and generally aligned with the open end 30 of the receptacle forming the toothpick holder. At the outer end of the wall portion 36, an inwardly inclined wall portion 38 is formed which converges towards the inner wall 22 and terminates in an outwardly flared end portion 40 which defines a gripping area 42 that engages the surface of the visor 12 in opposed relation to the surface of the visor 12 engaged by the inner wall 22 thereby grippingly and removably mounting the holder to the visor with a end edge of the visor engaging the inner surface of the wall portion 36 thereby mounting the holder 10 on the end edge of the visor 12 as illustrated in FIG. 1.

The periphery of the walls 20, 22, 26 and 28 include a recess 44 which combines with the wall portion 34 to form a groove with the recess and groove receiving a closure cap 46 of the same shape and configuration as the receptacle which telescopes over the open end 30 to form a closure for the open end 30. The cap 46 includes an end wall and is constructed of relatively soft, flexible, resilient material such as neoprene or soft rubber with the end wall of the cap including a longitudinally elongated slit 48 which can be distended sufficiently to enable toothpicks 18 to be inserted and removed with the edges of the slit 48 frictionally gripping and retaining the toothpicks 18 in position with one end of the toothpick abutting the inner surface of the bottom wall 24 and the other end of the toothpick 18 projecting outwardly from the cap 46 thus rendering the ends of the toothpicks 18 accessible to a vehicle operator. When desired, the vehicle operator can merely reach up to a point above the end of the rearview mirror with tactile engagement of the hand with the rearview mirror and the visor providing guidance to the operator to effectively grip one of the toothpicks and extract it for use thereby enabling the vehicle operator to maintain full time and attention to driver responsibilities. The cap 46 may be secured in placed telescopically over the open end of the receptacle by friction and its inherent resiliency or it may be adhesively secured in place if desired. The walls 20, 22, 24, 26 and 28 and the clip 32 are of unitary plastic construction which may be molded in a conventional manner with the receptacle and clip being substantially rigid but the clip being sufficiently flexible and resilient to enable the holder to be easily attached to sun visors of various thicknesses including cushioned sun visors and the like which are used on present day vehicles. The holder may be constructed of various colors compatible with or contrasting to the color of the sun visor or other interior surfaces and, if desired, informational material, logos, trademarks or the like may be provided on the surface of the outer wall 20.

The toothpick holder provides an effective removable support for a plurality of toothpicks which can be easily loaded into the holder with the holder either mounted on the visor or removed therefrom and enables convenient access to the toothpicks to enable the operator to maintain full control of the vehicle.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. The combination of an interior sun visor on an automotive vehicle in which the sun visor is located above a windshield and having an inner end generally aligned with one end edge of a rearview mirror, a toothpick holder mounted on the inner end edge of the su visor and including a receptacle having a closed end and an open end with the open end being disposed adjacent the end edge of the sun visor and generally aligned with the inner end of a rearview mirror, a closure cap of resilient, flexible material mounted on said receptacle, said closure cap including a slit formed therein, a plurality of toothpicks inserted in the slit with one end of each toothpick extending beyond the cap in a generally perpendicular relation to the inner end edge of the sun visor for ready access to the toothpicks by an operator of the vehicle with the operator maintaining full time and attention to driver responsibilities.

2. The combination as defined in claim 1 wherein said slit is longitudinally elongated and includes substantially parallel edges closely spaced to be distended by insertion and removal of toothpicks to removably and securely mount the toothpicks in a position for ready access by the vehicle operator.

3. The combination as defined in claim 2 wherein said cap is telescoped over the open end of the receptacle, said receptacle and supporting clip being of one piece, unitary plastic construction.

* * * * *